US009356973B2

(12) United States Patent
Belling et al.

(10) Patent No.: US 9,356,973 B2
(45) Date of Patent: May 31, 2016

(54) METHOD FOR THE TRANSMISSION OF SIGNALLING DATA IN A NETWORK INTERFACE UNIT AND IN A CONTROL UNIT AND CORRESPONDING DEVICES

(75) Inventors: Thomas Belling, Erding (DE); Franz Kalleitner, St. Georgen im Attergau (AT); Norbert Seitter, Kempten (DE); Andreas Trapp, München (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 1353 days.

(21) Appl. No.: 13/064,589

(22) Filed: Apr. 1, 2011

(65) Prior Publication Data

US 2011/0181682 A1   Jul. 28, 2011

Related U.S. Application Data

(63) Continuation of application No. 12/083,875, filed as application No. PCT/EP2006/066006 on Sep. 5, 2006, now Pat. No. 8,036,234.

(30) Foreign Application Priority Data

Oct. 21, 2005   (DE) .................. 10 2005 050 587

(51) Int. Cl.
| H04N 7/14 | (2006.01) |
| H04L 29/06 | (2006.01) |
| H04M 7/00 | (2006.01) |
| H04M 7/06 | (2006.01) |
| H04Q 3/00 | (2006.01) |

(52) U.S. Cl.
CPC .......... *H04L 65/103* (2013.01); *H04L 65/1016* (2013.01); *H04L 65/1043* (2013.01); *H04M 7/0039* (2013.01); *H04M 7/0093* (2013.01); *H04M 7/066* (2013.01); *H04Q 3/0025* (2013.01)

(58) Field of Classification Search
USPC ........................................... 370/352
See application file for complete search history.

(56) References Cited

U.S. PATENT DOCUMENTS

| 6,011,803 A | 1/2000 | Bicknell et al. |
| 6,118,777 A | 9/2000 | Sylvain |
| 6,266,082 B1 * | 7/2001 | Yonezawa et al. ............ 348/159 |
| 6,754,180 B1 | 6/2004 | Christie |

(Continued)

FOREIGN PATENT DOCUMENTS

| JP | 10-294768 | 11/1998 |
| JP | 2001-223752 | 8/2001 |

(Continued)

OTHER PUBLICATIONS

Japanese Office Action mailed Feb. 28, 2013 in corresponding Japanese Patent Application No. 2011-002241.

(Continued)

*Primary Examiner* — Maria El-Zoobi
(74) *Attorney, Agent, or Firm* — Henry M. Feiereisen LLC

(57) ABSTRACT

The embodiments relate to, among other things, a network interface unit (IM-MGW) in which signaling data is separated from useful data by the values of received data. The signaling data is tunneled to a control unit (MGCF). Two different data transmission networks (CS, IMS) can thus be simply combined, in particular, for video telephony.

5 Claims, 4 Drawing Sheets

(56) References Cited

U.S. PATENT DOCUMENTS

| | | | |
|---|---|---|---|
| 6,868,265 B2* | 3/2005 | Zodnik | 455/404.1 |
| 7,192,899 B2 | 3/2007 | Komatsu | |
| 2003/0026245 A1 | 2/2003 | Ejzak | |
| 2004/0196867 A1 | 10/2004 | Ejzak et al. | |
| 2005/0007989 A1 | 1/2005 | Wittmann | |
| 2005/0030889 A1* | 2/2005 | Tao | 370/229 |
| 2005/0038992 A1 | 2/2005 | Pelaez | |
| 2005/0083943 A1 | 4/2005 | Lee et al. | |
| 2006/0256752 A1 | 11/2006 | Svensson et al. | |
| 2006/0293024 A1* | 12/2006 | Benco et al. | 455/404.2 |
| 2007/0153766 A1* | 7/2007 | Bienn et al. | 370/352 |
| 2008/0186952 A1* | 8/2008 | Lin et al. | 370/352 |
| 2008/0198993 A1* | 8/2008 | Imbimbo et al. | 379/213.01 |
| 2008/0298799 A1* | 12/2008 | Takihiro et al. | 398/2 |
| 2009/0016517 A1* | 1/2009 | Emmanuel | 379/207.12 |
| 2010/0046506 A1* | 2/2010 | Feldman et al. | 370/352 |
| 2010/0058457 A1 | 3/2010 | Ormazabal | |
| 2010/0272072 A1* | 10/2010 | Bienn | H04M 7/0072 370/335 |

FOREIGN PATENT DOCUMENTS

| | | |
|---|---|---|
| JP | 2003-515994 | 5/2003 |
| JP | 2004-23336 | 1/2004 |
| JP | 2004-312738 | 11/2004 |
| JP | 2004-362562 | 12/2004 |
| JP | 2004-363993 | 12/2004 |
| JP | 2005-94750 | 4/2005 |
| JP | 4-869070 B2 | 2/2012 |
| WO | WO 02/32153 A1 | 4/2002 |
| WO | WO 02/052825 A1 | 7/2002 |
| WO | WO 2004/091250 A1 | 10/2004 |

OTHER PUBLICATIONS

Ericsson; "Background of the technology associated with this invention: 3GPP IP Multimedia Subsystem, 3GPP2 Multimedia Domain, CDMA2000 1× EV DO Rev A RAN and CMDA2000 1×", Dec. 18, 2003, 11 Pp.

ITU-T H.248.12 Amendment 1 (Nov. 2002); "Gateway control protocol: H.248.1 packages for H.323 and H.324 interworking, Amendment 1: New Annex A: Extended H.324, H.245 command and H.245 indication packages", Nov. 2002, pp. 1-9.

ITU-T H.248.20 (Nov. 2002), "Gateway control protocol: The use of local and remote descriptors with H.221 and H.223 multiplexing", p. 3, Example* 14 Pp., Nov. 2002.

Sayre C., "Proposal for support of H.324 Annex C multimedia calls in decomposed gateway," ITU Study Group 16, Delayed Contribution D.59 (WP 2/16), pp. 1-10, Nov. 2000.

German Office Action mailed Jun. 29, 2009 in corresponding German Patent Application No. 2005P19042 DE.

European Office Action mailed Sep. 14, 2010 in corresponding European Patent Application No. 10007920.1.

Written Opinion of the International Searching Authority mailed Dec. 22, 2006 in corresponding PCT Application No. PCT/EP2006/066006.

International Search Report mailed Dec. 22, 2006 in corresponding PCT Application No. PCT/EP2006/066006.

Notification of Transmittal of the International Search Report mailed Dec. 22, 2006 in corresponding PCT Application No. PCT/EP2006/066006.

Japanese Office Action mailed Mar. 16, 2011 in corresponding Japanese Patent Application No. 2008-535993.

ITU-T H.248.12, "Gateway control protocol: H.248.1 packages for H.323 and H.324 interworking", Jul. 2001, 30 pages.

ITU-T H.246 Annex F, "Interworking of H-series multimedia terminals with H-Series multimedia terminals and voice/voiceband terminals on GSTN and ISDN", Jul. 2001, 16 pages.

Ramnath A. Lakshimi-Ratan, "The Lucent Technologies Softswitch-Realizing the Promise of Convergence" Bell Labs Technical, vol. 4, No. 2, Apr.-Jun. 1999, pp. 174-195.

Takeshi Hattori, "Wireless Broadband Textbook", K.K. IDG Japan, Jun. 2002, First Edition, pp. 219-221.

Hiroshi Waki, "Signaling Protocols for Next Generation Networks", Technical Report of IEICE, Oct. 2000, vol. 100, No. 394, pp. 31-36.

* cited by examiner

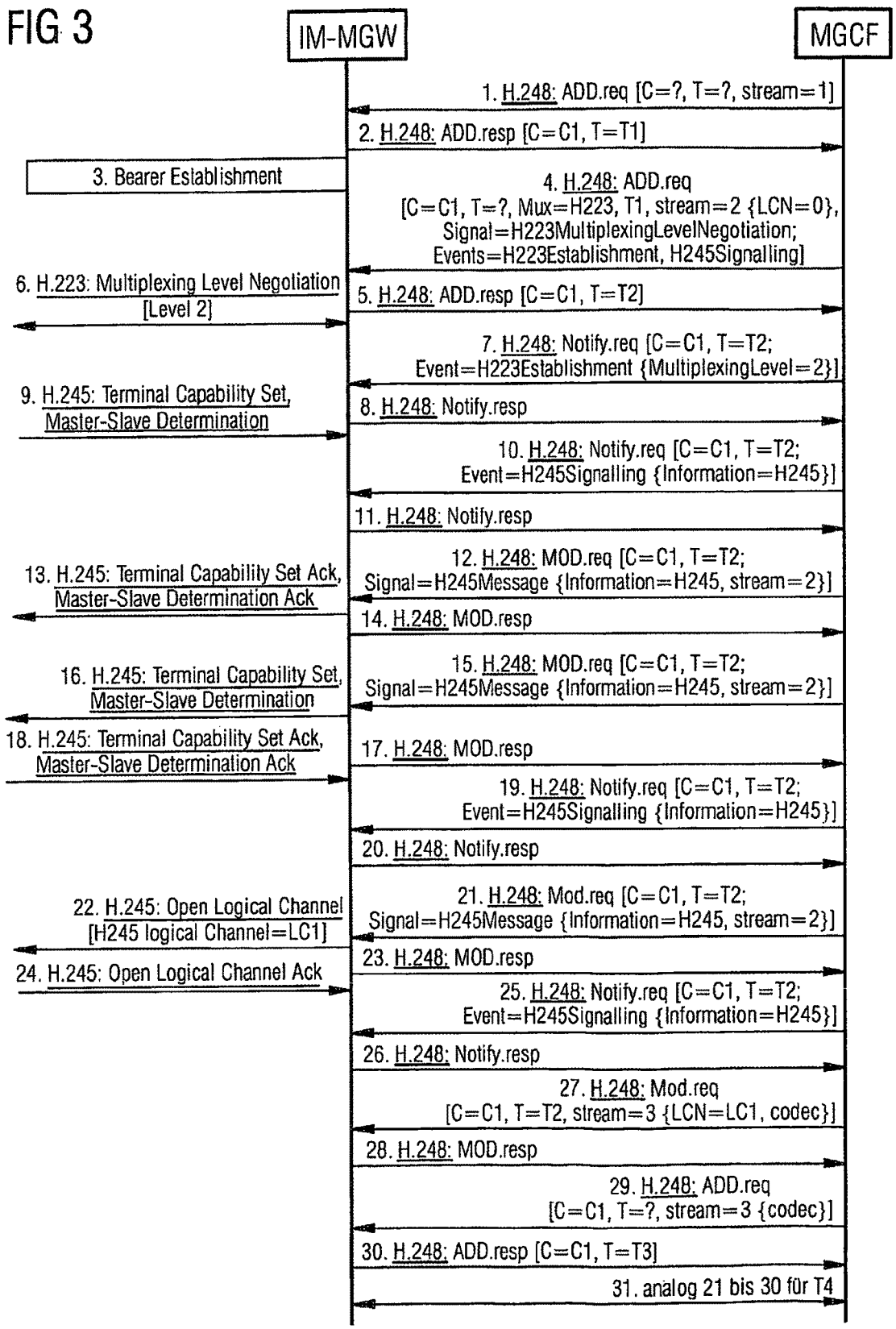

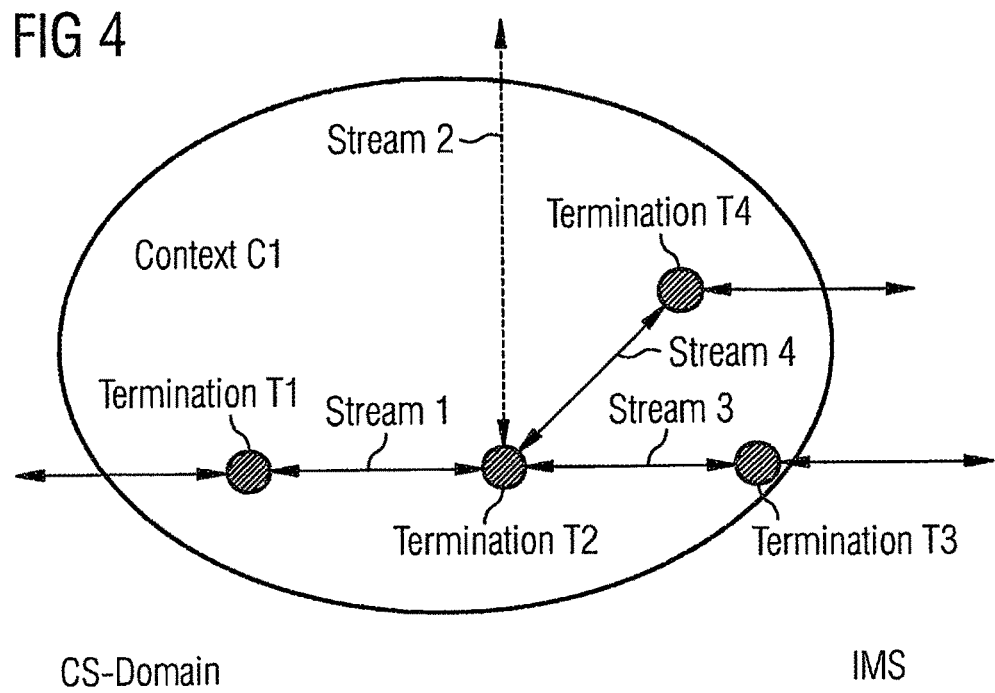

METHOD FOR THE TRANSMISSION OF SIGNALLING DATA IN A NETWORK INTERFACE UNIT AND IN A CONTROL UNIT AND CORRESPONDING DEVICES

CROSS REFERENCE TO RELATED APPLICATIONS

This application is a continuation of U.S. application Ser. No. 12/083,875, filed Apr. 21, 2008, now U.S. Pat. No. 8,036,234 which is based on and hereby claims priority to German Application No. 10 2005 050 587.2 filed on Oct. 21, 2005, the contents of all of which are hereby incorporated by reference.

BACKGROUND

The invention relates, inter alia, to a method for forwarding signaling data in an interworking unit, with the operation:
Receiving data in an interworking unit or a gateway from a first data transmission network (CS) over a data transmission connection or over a bearer connection, in which, for a data transmission service between two mobile stations (MS1, MS2) or a group of stations, signaling data and payload data are transmitted, with the interworking unit transmitting payload data between the first data transmission network (CS) in which signaling is in accordance with a first signaling method and a second data transmission network (IMS) in which signaling is in accordance with a second signaling method, with the first signaling method differing from the second signaling method.

In addition to the so-called "Circuit Switched (CS) domain" of a mobile radio network based on the 3rd Generation Partnership Project (3GPP), the so-called "IP Multimedia Subsystem" (IMS) is used for voice and video telephony and a so-called "interworking" of the relevant services, i.e. a connection of the services by a suitable conversion of the signaling used and of the bearer format of the data used is necessary between IMS and CS domain. As well as being used for the 3GPP "Global System for Mobile Communications" (GSM) and "Universal Mobile Telecommunications System" (UMTS) access networks, the IMS is also used for other access networks, for example "Wireless Local Area Network" (WLAN) and "Digital Subscriber Line" (DSL). It is precisely in these scenarios that it is initially to be expected that voice and video telephony will be undertaken via the IMS. Video telephony can also be used in a public telephone network, i.e. a Public Switched Telephone Network (PSTN), with the same in-band video-telephony-specific protocols being used as a rule for transport and signaling as in the 3GPP CS domain. Interworking from the PSTN to the IMS is also necessary.

Previously the standard has merely described interworking between IMS and CS domain or PSTN for voice telephony only. The present invention relates to the appropriate interworking for other services, especially for multimedia services, for example for video telephony. A demand for this is to be foreseen, since video telephony is increasing in significance both in the 3GPP CS domain and also in IMS, here in particular for access networks such as WLAN or DSL, or newly-arising network access options (e.g. Worldwide Interoperability for Microwave Access (WiMAX).

The interworking between IMS and a CS network, i.e. a PSTN or a 3GPP CS domain, is specified in 3GPP TS 29.163 from 3GPP Release 6 onwards only for pure voice telephony. In accordance with TS 29.163, the interworking of what is known as the call-control signaling takes place in the Media Gateway Control Function (MGCF). The interworking of the payload connection, i.e. the onward transfer and repackaging as well as if necessary the transcoding of the payload data, is undertaken in the so-called Internet Multimedia-Media Gateway (IM-MGW). The MGCF controls the IM-MGW by the H.248 protocol standardized by the ITU-T via the Mn interface, as further described in 3GPP TS 29.332.

In the CS network Bearer Independent Call Control (BICC), see ITU-T (International Telecommunication Union-Telecommunication Standardization Sector) Q.1902.x, or ISDN User Part (ISUP), see ITU-T Q.761 ff, is used for out-of-band call control signaling. In the case in which the call control signaling is routed separately from the bearer connections, this method is also referred as out-of-band signaling. Subsequently there also the option within the bearer connection of exchanging signaling messages, which is referred to as in-band signaling. In the case of ISUP, Time Division Multiplex (TDM) is used as bearer in the CS network, and in the case of BICC packet transport by Internet Protocol (IP) or Asynchronous Transfer mode (ATM). The negotiation about whether pure voice telephony or video telephony are used can be undertaken for ISUP during the call control signaling for setting up the call by the so-called ISUP UDI Fallback procedure. For BICC this negotiation can occur by means of the Service Change and UDI Fallback (SCUDIF) standardized in 3GPP TS 23.172, which also allows a change between voice telephony and video telephony during a call. Both UDI Fallback and SCUDIF use out-of-band signaling. In addition it is possible both for ISUP and BICC to not use the procedure and only attempt a call setup for video telephony, and, in the event of video telephony not being supported, abort the call setup. By contrast with optional negotiation between voice and video the negotiation of the voice and video codecs used for video telephony is undertaken "in-band", after video telephony has already been selected beforehand and a corresponding bearer connection has been established. A so-called BS30 data connection with a bandwidth of 64 kbyte/s is used for video telephony in the network. Within this data connection the H.324 protocol suite standardized by the ITU-T is used, with the variant H.324M adapted for mobile telephony being selected in the 3GPP CS domain. After the data connection is set up in this case the configuration of the multimedia connection is negotiated in-band via the ITU-T standardized H.245 protocol, in particular the video codec and speech codec used and the details of the respective codec configuration Voice and video as well as the signaling data are multiplexed by the H.223 protocol in the same bearer connection. For the 3GPP CS domain TS 26.110 further describes the use of the H.324 protocol suite or protocol series, with especially the so-called H.324M configuration being selected.

The most important execution sequences in setting up a 3G-324M session are as follows:

1. After the start of the ISUP or BICC call setup signaling, necessary resources are reserved that are needed for the desired "bearer" and subsequently the bearer is set up.

2. Start of the "in-band" negotiation. Initially negotiation of the H.223 multiplexer level which is to be used for this bearer.

3. Recognition of the master station which is opening the multistream connection by H.245 negotiation if necessary. This function is only needed if a conflict arises within the context of opening a bidirectional logical channel. This function is referred to as Master or Slave Determination (MSD).

4. The capabilities of the station sending the message are transmitted by so-called "Terminal Capability Set" H.245 messages. Such messages are sent independently of the two stations. These described capabilities contain the following information: Audio and video codec and their specific characteristics or their variants. Functional scope of the multiplexer, in detail which adaptation layer is supported (e.g. simple or nested multiplexing) and its mobile-specific extensions.

5. Setting up of "logical" channels for each media stream by H.245 signaling. From this point in time onwards, either with MSD or without, the station or the IM-MGW are ready to open logical channels to allow the exchange of voice, and/or video payload data. In the creation of a bidirectional logical channel, the channel number and the final media capabilities to be used are defined.

6. Definition of the multiplex characteristics by H.245.

7. Start of the transmission of video, audio/voice or data

Negotiation for video telephony is undertaken "out-of-band" in the IMS with the aid of the Session Description Protocol" (SDP), IETF (Internet Engineering Task Force) RFC (Request for Comment) 2327, which is transported by the Session Initiation Protocol (SIP), IETF RFC 3261. In this case the negotiation as to whether voice telephony or video telephony is used in linked to the negotiation of the codec used and is undertaken before or during of the setting up of the bearer. The SDP offer-answer mechanism in accordance with RFC 3264 is used. In this case the offering party sends a list of supported codecs in the SDP Offer message. After receiving this message the answering party sends an SDP Answer message containing the codec from the list that it also supports and wishes to use. The answering party may not specify any codecs that were not contained in the list of the SDP offer. By contrast with the CS domain, two separate bearers are used for voice and video, which each use the Real Time Transport Protocol (RTP), IETF RFC 3550. For the 3GPP IMS over the General Packet Radio Service (GPRS) access network 3GPP TS 26.235 describes the codecs to be used for video telephony.

Summarized below once again are the protocols and codecs used on the CS domain side and on the IMS side for video telephony.

CS network (especially 3GPP CS domain):
Call Control: BICC or ISUP.
Negotiation between pure voice telephony networks and video telephony can be undertaken for ISUP by UDI Fallback and for BICC by SCUDIF.
Multimedia Protocol suite: ITU-T H.324M (ITU-T H.324 Annex C)
Codec negotiation: ITU-T H.245 in-band negotiation about the CS bearer set up with 64 kbit/s (kilobits per second)
Video codec: Support of H.263 prescribed
ITU-T H.261 optional
MP4V-ES (simple video profile level 0) optional
Speech codec: Support of NB-AMR (Narrow Band Adaptive MultiRate) prescribed
WB-AMR (Wide Band AMR) optional
ITU-T G.723.1 recommended
Transport Multiplexing of voice and video in a bearer in accordance with ITU-T H.223 Annex A+B
IMS (codecs for GPRS (General Packet Radio Service) access network)
Call Control: SIP
Includes both negotiation between pure voice telephony networks and video telephony, and also codec negotiation.
Codec negotiation: Before setup of the bearer, out-of-band by SDP, which is transported in SIP.
Video codec: Support of H.263 prescribed
ITU-T H.264 optional,
MP4V-ES (simple video profile level 0) optional
Speech codec: Support of NB-AMR and WB-AMR prescribed.
Transport Two separate RTP bearers for voice and video using different so-called RTP Payload" formats:
Voice NB-AMR+WB-AMR: IETF RFC 3267
Video: H.263: IETF RFC 2429
H.264 (AVC): IETF RFC 3984
MPEG-4: IETF RFC 3016 parallel RTP media streams are synchronized by RTP timestamps which are negotiated by the Real Time Control Protocol (RTCP, see IETF RFC 3550).

As well as or in place of the codec specified here, other codecs can also be supported by the stations, especially if the CS stations are located in the PSTN or the IMS stations do not use GPRS as the access network.

With interworking for exclusively voice telephony out-of-band signaling is used in both networks. A conversion of the signaling protocol can thus be comparatively easily performed at the borders of the two data transmission networks because all signaling messages can be merged in a simple manner at one unit. On the other hand in-band signaling is used in the CS network with video telephony for example which is received by the IM-MWG, whereas in the IMS out-of-band signaling is used which is received by the MGCF.

However the problem of merging the signaling between the two data transmission networks also occurs with other multimedia services or with other services.

SUMMARY

An aspect of the embodiments is to specify a simple method for signaling between two different data transmission networks. In particular an aspect is to specify simple methods for interworking of the signaling between two different data transmission networks, with signaling in the first data transmission network being sent or received in-band in a bearer which is assigned to a transmission service between two stations or a group of stations assigned from a network interface unit (e.g. IM-MGW) whereas the signaling in the second data transmission network is sent or received out-of-band in a control unit (e.g. MGCF) which exchanges messages with the first network unit. Associated units are also to be specified.

In addition to the operations listed above, the method in accordance with the invention contains the following operations:
In the interworking unit preferably with the aid of the values of the received data, separation of signaling data and payload data,
Forwarding of the received signaling data in unchanged form from the network interface unit to a control unit,
optionally in the control unit (MGCF) based on a signaling message defined by the signaling data, creation in accordance with the first signaling method of at least one signaling message in accordance with second signaling method, and
In the network interface unit, forwarding of the payload data from the first data transmission network into the second data transmission network In particular automatic separation based on the values of the signaling enables a simple decision about forwarding to be made. This is the prerequisite for a plurality of options for influencing the signaling at the boundaries between the two data transmission networks. The unchanged forwarding of the signaling messages makes a plurality of new applications possible, with which an external control unit can especially be used.

In one development the data transmission connection is a connection at a protocol level which is located above the protocol layer for physical data transmission. In a further development the data transmission connection is set up and also cleared down with the aid of signaling messages. In such cases the data transmission connection is assigned its own identifier. For example the data transmission connection is a logical channel, i.e. a connection at a higher protocol level.

In one development the data transmission connection is used for transmission of at least two different types of payload data, especially voice data and video data. The term multimedia is also used in this context.

The separation is undertaken in one development with the aid of the values of the received data, especially by reading this data and subsequently comparing it with comparison data.

In a further development of the embodied method the first signaling method is a signaling method in which signaling data and payload data are transmitted over the same transmission link, i.e. a so-called in-band method. The second signaling method by contrast is a signaling method in which signaling data is transmitted over a different transmission link from the payload data, i.e. an out-of-band method. The developments still allow the signaling data to be forwarded between the two data transmission networks.

In another development of the embodied method the first data transmission network is a circuit-switched data transmission network, a data transmission network with data transmission in accordance with IP (Internet Protocol) or an ATM (Asynchronous Transfer) data transmission network. The circuit-switched data transmission network is for example a PSTN (Public Switching Telephone Network), an ISDN (Integrated Services Digital Network), a PLMN (GSM (Global System for Mobile Communications) Public Land Mobile Network) or a 3GPP CS domain. The second data transmission network by contrast is a data transmission network operating in accordance with the Internet Protocol, i.e. in which the payload data is transmitted in accordance with Internet protocol of the IETF (Internet Engineering Task Force) and in which signaling is especially in accordance with SIP, for example an IMS.

In a further development of the embodied method the signaling data is transmitted in signaling data packets and the payload data in payload data packets. The separation is undertaken on the basis of an H.223 multiplex code which specifies a part data stream which is transmitted over the data transmission connection or over the bearer connection. The multiplex code with the value 0 is used for signaling in accordance with H.223.

In a next development of the embodied method the following operations are executed:
  Forwarding of the signaling data to the control unit via an external transmission link, and
  Creation of the signaling message in accordance with the second signaling method in the control unit.

This enables interworking unit and control unit to be manufactured separately from each other. In the choice of sites too there is a greater degree of freedom by comparison with an embodiment in which the interworking unit and control unit are accommodated in the same housing and are supplied with power by the same AC adapter.

In a further development the control unit also processes signaling data with signaling messages in accordance with BICC or ISUP. This means that the control unit can be used for the processing of a number of signaling protocols and is more universally applicable.

In another development signaling messages are transmitted in accordance with Standard ITU-T H.248 or MEGACO or in accordance with MGCP (Media Gateway Control Protocol) of the IETF between the control unit and the interworking unit. However other protocols which allow interworking of units from different manufacturers are also suitable.

In a further development of the embodied method the following operation is executed:
  Causing the control unit to forward or to separate the data. This enables a separation to be initiated automatically and optionally, with different configurations also able to be set.

In one development the control unit causes the data to be forwarded by transmitting an H.248 message containing a code (e.g. H245Signalling) which specifies what is to be forwarded. The code is especially an H.248 event code, e.g. an event name such as "H245Signalling". In another development the interworking unit forwards a signaling message with an H.248-Notify-Request message containing as a parameter the signaling message to be forwarded. The parameter in one development is a parameter of an H.248 event, of which the code (e.g. H245Signalling) specifies that a message will be forwarded. Thus the same code as the H.248 message first mentioned in this paragraph can be used. The use of these messages means that the H.248 standard only has to be extended slightly and only a few signaling messages are necessary.

In the embodiments the signaling data is forwarded unchanged by the interworking unit to the control unit, this process also being referred to as tunneling. In particular the interworking unit does not evaluate the signaling data, apart from the read processes required for separation. The interworking unit only tests whether signaling data is involved or not. However the interworking unit does not determine which signaling message is involved.

In one development the control function (MGCF) first terminates signaling in accordance with the first signaling method, i.e. it concludes the signaling, with a signaling message in accordance with second signaling method also being sent in one embodiment, or it begins signaling in accordance with the first signaling method for example on the basis of a signaling message received in accordance with the second signaling method.

The control function transfers to the interworking unit in another development a signaling message in accordance with first signaling method as parameter in a message, e.g. an H.248 message, especially in an H.248-Modify-Request message, with the H.248 message containing a code (e.g. H245Message) which specifies that a message in accordance with the first signaling method will be forwarded as a parameter. In another development the forwarded message is transmitted unchanged from the interworking unit to a station side in the first data transmission network. This procedure means that messages already standardized barely have to be changed.

In a next development the signaling data and the payload data are transmitted to the interworking unit in accordance with a multiplex method, especially in accordance with the method defined in the ITU-T H.223 standard. Such multiplex methods are especially suitable for multimedia data transmission and allow a transmission which is adapted to the respective data volume in the individual multimedia channels. Thus signaling data can be transmitted not only before but also during payload data transmission in order to change the multiplexing. Payload data is especially voice data, picture data, video data, text data, program data etc.

In one development the control unit causes the interworking unit to begin the negotiation of an H.223 multiplex level, preferably by transmitting an H.248 message which specifies an H.248 signal code (e.g.

H223MultiplexingLevelNegotiation) which specifies that the multiplexing level negotiation is to be started.

In a next development the control function causes the interworking unit to transmit a message to the control function in which the value of a negotiated multiplexing level is specified, especially by transmission of an H.248 message which contains a code (e.g. H223Establishment) which specifies that the value of the multiplexing level is to be transmitted to the control function, especially an H.248 event code. The value of the multiplexing level is a measure for the complexity of a multiplexing method. In a further development, after negotiation of a H.223 multiplexing level, the interworking unit of the control unit transfers the value of the multiplexing level in an H.248 message, especially in a H.248-Notify-Request message In one embodiment the control unit detects on the basis of the receipt of a message with the value of the negotiated multiplexing level, or on the basis of the absence of such a message, whether a multimedia connection has been established, especially a video telephony connection.

As an alternative or in addition the first signaling method is a method in accordance with the ITU-T H.245 protocol which is used particularly widely. However other suitable methods are also used.

In one development the second signaling method is the SIP signaling method or an equivalent signaling method.

In one development the control function takes into consideration when creating a signaling message in accordance with the first signaling protocol the characteristics of the interworking unit, preferably in the creation of a TerminalCapabilitySet message in accordance with H.245. The result achieved by this is that the payload data transmission can be set optimally at the network boundaries.

In a next development the following operations are executed:
  Receipt in the interworking unit of signaling data coming via a first transmission link from a control function at the boundary between the first data transmission network and the second data transmission network,
  Receipt in the interworking unit of payload data from the second data transmission network via a second transmission link, with the payload data being affected by the signaling data,
  Transmission in the interworking unit of the received signaling data and the received payload data via the same transmission link, especially in the same data transmission connection.

Thus the interworking unit is effectively also used for forwarding signaling data in the other direction of transmission.

The embodiments also relates, in a second aspect, to a method for forwarding signaling data in a control unit with the following operations:
  In a control unit, which is used for transmission of signaling data between a first data transmission network (CS) with a first signaling method and a second data transmission network with a second signaling method, receipt of signaling data in accordance with the first signaling method with the first signaling method being a signaling method in which a bearer connection is used in which, for a data transmission service between two stations (MS1, MS2) or a group of stations, the signaling data in accordance with the first signaling method and payload data are transmitted, and with the second signaling method being a signaling method in which signaling data and payload data are transmitted over different transmission links from one another.

Preferably on the basis of a signaling message defined in accordance with the first signaling method, creation of a signaling message in accordance with the second signaling method or a number of signaling messages in accordance with second signaling method in the control unit.

The method in accordance with the second aspect is closely related to the method in accordance with first aspect, so that the advantages stated above apply.

In a development of the method in accordance with the second aspect the following operations are executed:
  Causing the signaling data to be sent from an interworking unit by the control unit, with the interworking unit forwarding payload data affected by the signaling data between the first data transmission network and the second data transmission network. Here too the reader is referred to the advantages given above, especially to a flexible control of the interworking unit by the control unit.

In another development of the method in accordance with the second aspect the following operations are executed:
  Receipt in the control unit of signaling data in accordance with the second signaling method,
  Creation, on the basis of a signaling message defined by the received signaling data in accordance with the second signaling method, of a signaling message in accordance with the first signaling method. Thus the control unit operates in both directions of transmission and modules in the control unit can be used multiple times.

The invention further relates to an interworking unit which is especially suited to executing the method in accordance with the first aspect or one of its developments. Thus the technical effect described above also applies to the embodied interworking unit.

The invention further relates to a control unit which is especially suited to executing the method in accordance with the first, but especially in accordance with the second aspect, so that the technical effects described above likewise apply.

BRIEF DESCRIPTION OF THE DRAWINGS

These and other aspects and advantages will become more apparent and more readily appreciated from the following description of the exemplary embodiments, taken in conjunction with the accompanying drawings of which:
FIG. 3 shows method operations and signaling messages for a control unit and an interworking unit,
and
  FIG. 4 shows the context for a video telephony call.

DETAILED DESCRIPTION OF THE PREFERRED EMBODIMENT

Figure 1:
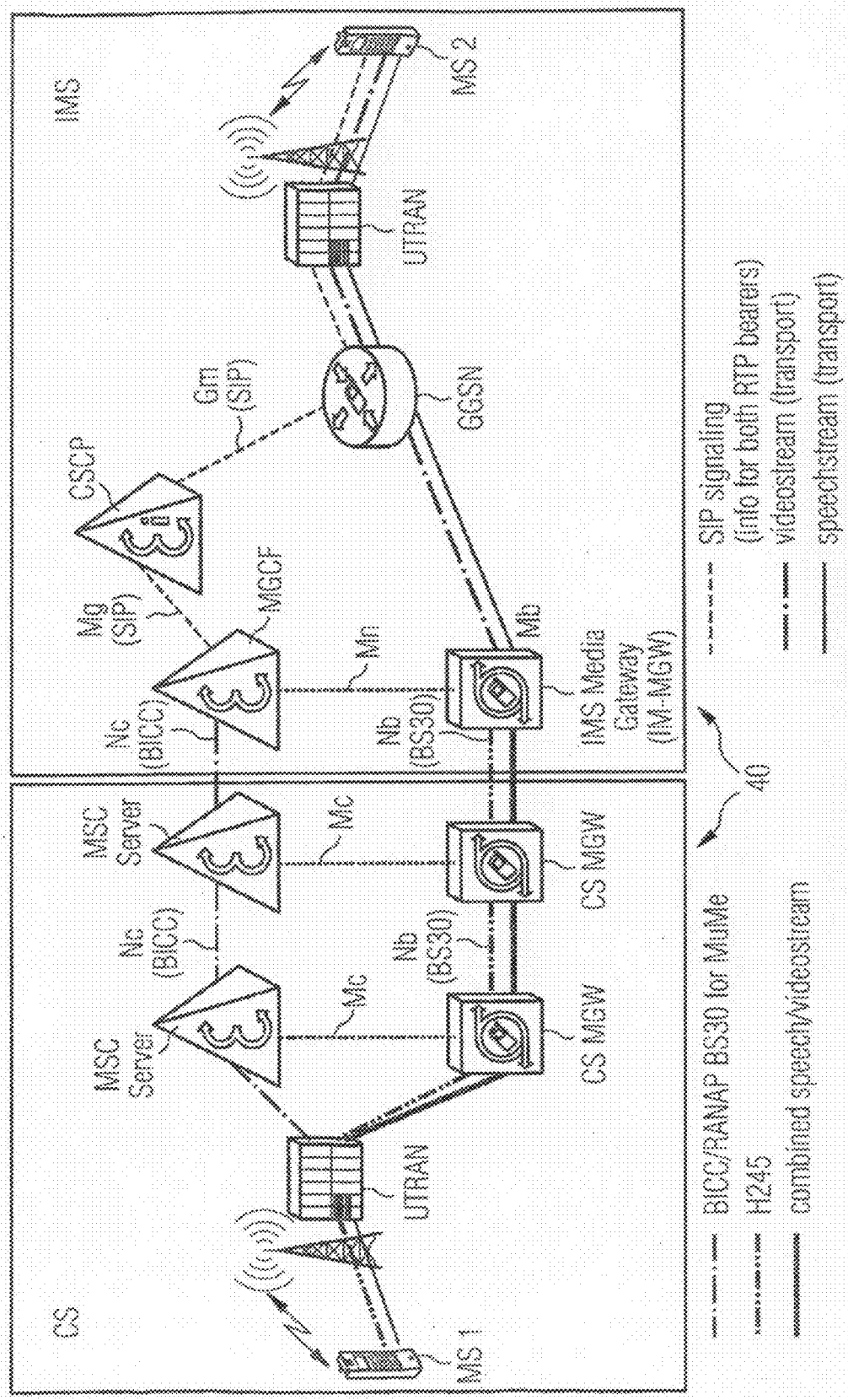
FIG. 1 is a typical network configuration.

Reference will now be made in detail to the preferred embodiments, examples of which are illustrated in the accompanying drawings, wherein like reference numerals refer to like elements throughout.

It is desirable for example to use the same video codec and if possible also the same speech codec on the CS side and in the IMS in order to avoid any transcoding. Transcoding especially of the video codec, but to a small extent of the speech codec too, would demand significant computing power and resources in the IM-MGW. In addition the transmission would be delayed and the quality of the picture or of the speech would be worsened. If the required bandwidth for the codec on the CS domain side and the IMS is different, additional bandwidth would be used on one side, without this improving the picture or speech quality.

To this end it is necessary for example for the MGCF and the IM-MGW to exchange suitable information:

For example in relation to the negotiation of the voice and video codec by H.245 and SIP/SDP and in relation to the establishment of the bearer connection by H.223.

A method for exchanging suitable information relating to the negotiation of the voice and video codec, e.g. by H.245 and the establishment of the bearer connection, e.g. by H.223 between MGCF and IM-MGW, is the subject matter of the present exemplary embodiment. This largely avoids transcoding, for video telephony for example. The MGCF and the IM-MGW connect a CS network, that is a PSTN or a 3GPP CS domain for example, as well as an IP network which uses SIP and SDP for negotiation of the codec, i.e. the IMS for example. In other exemplary embodiments however transcoding is executed.

The H.245 Client, i.e. the functional unit which terminates the H.245 protocol, is located in the MGCF. This is advantageous since it enables the H.245 client to simply exchange information via internal interfaces relating to the selection of the codec and of the execution sequence of the call setup with the functional components responsible for the call control, preferably with the functional component(s), which are responsible on the IMS side for the treatment of the SIP and of the SDP.

A central idea of the exemplary embodiment is that H.245 messages received from the CS network can be unpacked by the IM-MGW from the H.223 protocol and then forwarded transparently in the IM-MGW, i.e. unchanged and without any Interpretation of the content being needed, packed in the H.248 protocol via the Mn interface to the MGCF. Likewise H.245 messages are created in the MGCF and transmitted packed in the H.248 protocol to the IM-MGW. The IM-MGW takes these messages from the H.248 protocol and then packs them transparently within the H.223 protocol.

On call setup the MGCF configures the IM-MGW so that it receives H.245 messages and forwards or tunnels received H.245 messages unprocessed. Preferably the IM-MGW uses for this purpose a new so-called H.248 event still to be standardized, which the MGCF specifies when it sets up a termination responsible for handling the multiplexed H.223 protocol. In the description below, if the IM-MGW receives one or more H.245 message(s), it inventively uses an H.248 Notify message, in which it specifies the newly-defined event and specifies the H.245 message(s) as parameter of the event.

In order to send one or more H.245 message(s) to the IM-MGW, the MGCF preferably uses an H.248 Modify message, into which it preferably inserts a new H.248 signal yet to be standardized and specifies the H.245 message(s) as parameter of the signal.

If the MGCF detects or assumes from the call control signaling that video telephony in accordance with H.324 is desired on the CS side, the MGCF first configures at the IM-MGW a termination for handling the H.223 protocol. The reader is referred to the literature about H.248 for a more precise meaning of a termination. The MGCF instructs the IM-MGW to execute the H.223 negotiation of the multiplex level autonomously and to notify it after finishing the negotiation about the level negotiated. The MGCF uses the received information on the one hand to subsequently make correct settings in the H.245 Terminal Capability Set message which it creates. On the other hand the MGCF can establish from the absence of the notification that the network-side bearer connection will not or will not yet be used for video telephony and to react to this in the call control signaling, for example by reconfiguring the call to another service such as for voice telephony or to end the connection.

Preferably the MGCF uses a new H.248 signal yet to be standardized within an H.248 Add or Modify message in order to request the IM-MGW to begin the H.223 negotiation of the multiplex level. Preferably the IM-MGW uses a new H.248 event yet to be standardized within the same message to request the MGCF to notify it about the multiplex level. If, in the description below, the IM-MGW has negotiated the level, it uses an H.248 Notify message in which it specifies the newly-defined event and specifies the level as a parameter of the event.

After successful negotiation of the multiplexer level H.223 protocol data can be sent. H.245 command messages and control messages can be transmitted at this early point in time in special data packets. To this end the H.245 messages are packed for example in the Numbered Simple Retransmission Protocol" (NSRP). In accordance with the NSRP Specification as defined in H.324, no new H.245 message may be sent unless an acknowledgement for the last NSRP message sent has been received. It is advantageous for the H.245 protocol to be transported packed in the NSRP via the Mn interface and for the H.245 client in the MGCF also to be responsible for the termination of the MSRP.

In the case of a call set up from the CS network side in the direction of the IMS it can occur that the connection setup is forwarded by the IMS to another MGCF. In this case it is advantageous for the MGCF to configure the IM-MGW so that it forwards the BS30 packet data service transparently, for example using what is known as the clearmode codec, IETF RFC 4040. The MGCF negotiates the transparent transport of the data service by the SIP/SDP signaling exchanged with the other MGCF. In one embodiment the MGCF configures the IM-MGW initially only for the BS30 service, and does not yet switch the data connections through. As soon as the MGCF receives from the IMS side signaling relating to the selected codec, the MGCF can detect whether video telephony is involved, and in this case configures the IM-MGW so that it starts the in-band H.223 negotiation. If on the other hand a transparent transport is selected, no reconfiguration of the IM-MGW is necessary.

In accordance with the H.245 standard the MGCF must, as H.245 client, create what is referred to as an H.245 Terminal Capability Set message. This message describes the functions of the H.324 protocol which will be supported at the H.324 end point in the IM-MGW and MGCF. This includes at least one item of the following information:

Audio and video codec and their specific characteristics or their variants

Functional scope of the multiplexer, in detail which adaptation layer will be supported (e.g. the nesting depth of the multiplexing, i.e. simple or nested multiplexing) and its mobile-specific extensions.

To provide this information the MGCF must take account of the capabilities of the IM-MGW, i.e. for example which H.223 protocol options (e.g. the nesting depth for multiplexing) and which codecs the IM-MGW supports. The MGCF possesses either configured knowledge about this capability, or it queries this capability by an H.248 AuditCapabilities message from the IM-MGW. The MGCF preferably also takes into account information from the SIP/SDP signaling in selecting the capability specifies in the Terminal Capability Set, especially as regards the specified codec. Preferably the MGCF selects codecs that are supported both on the MGCF side and on the IMS side, in order to avoid transcoding.

It is advantageous for the MGCF to forward information regarding the codec in the SIP/SDP signaling contained in a received H.245 Terminal Capability Set message.

As soon as a codec and a logical H.245 channel have been defined for a media data stream, for example an audio or video media stream, by H.245 Open logical Channel messages which the MGCF sends or receives, the MGCF inventively configures the IM-MGW so that it transfers the media stream between the CS network side and the IMS side. The MGCF specifies for the two sides the codec which has been selected. If the same codec in the same configuration was selected on both sides, the IM-MGW does not need to use a transcoder.

FIG. 1 shows a typical network configuration of a data transmission network 40, which makes it possible for a mobile station MS1 connected to the 3GPP CS domain to communicate with a mobile station MS2 connected to the IMS. The CS domain is connected to the IMS with the aid of a Media Gateway Control Function (MGCF) and an IMS Media Gateway (IM-MGW). The MGCF controls the IM-MGW by the H.248 protocol standardized by the ITU-T via the Mn interface. On the CS domain side Mobile Switching Center (MSC) servers, which communicate with one another via BICC signaling, see interface Nc, and with the MGCF see interface Mc, are located in the core network. They each control CS MGWs. The CS MGWs are connected to each other and to the IM-MGW via the Nb interface. The BS30 bearer service is used for video telephony. MS1 is connected by a radio access network, for example a UTRAN (UMTS Terrestrial Radio Access Network), to an MSC server of a CS MGW. On the IMS side the MGCF communicates via an interface Mg with the aid of the SIP Call Control protocol with call session control functions (CSCF) which forward the signaling via an interface Gm and the Gateway GPRS support node (GGSN) and a radio access network, for example a UTRAN, to the mobile station MS2. Data is transported from the IMS Media Gateway via the Mb interface to the GGSN, which likewise passes it on via the radio access network to the MS.

Figure 2:
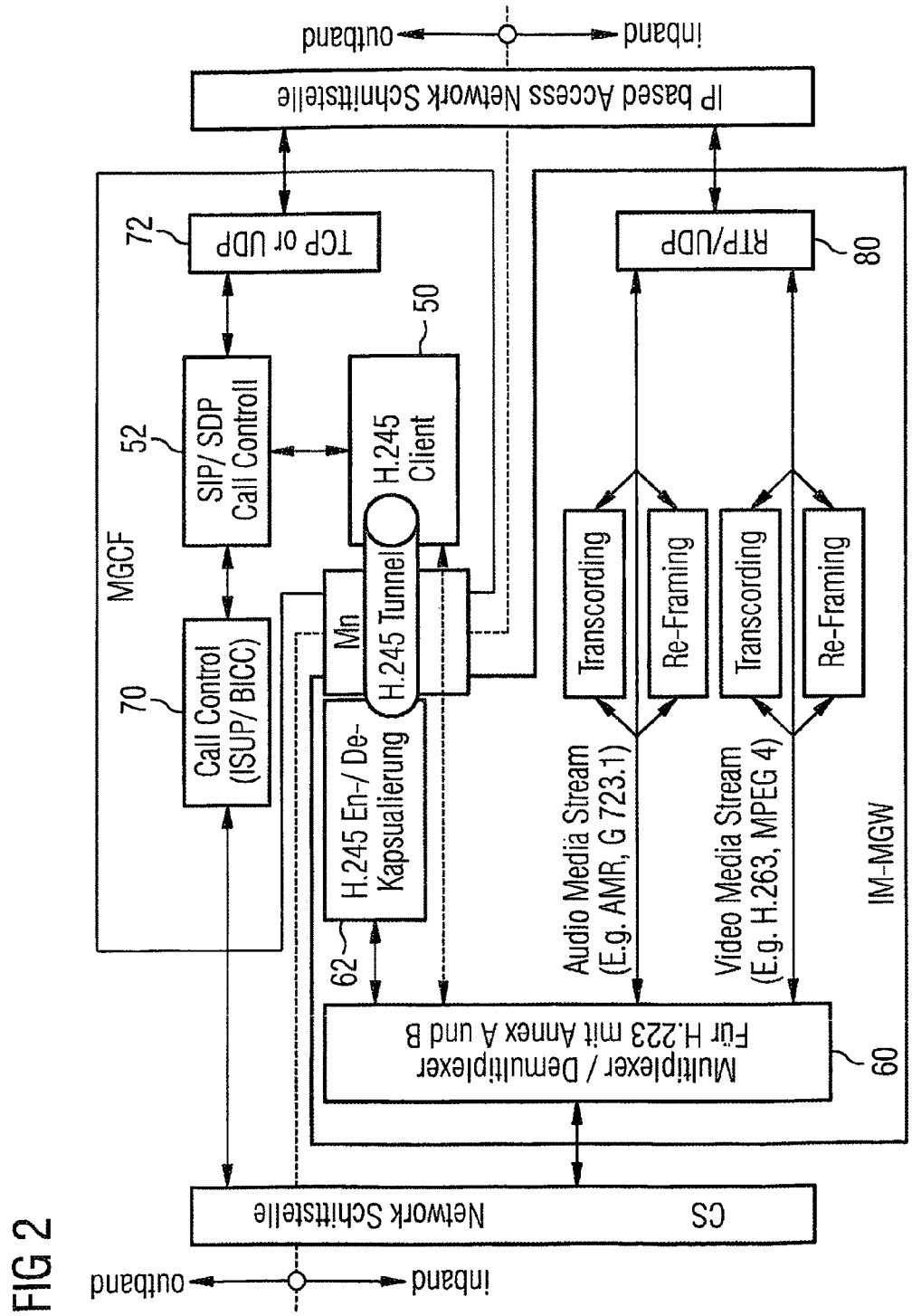
FIG. 2 is a block diagram for a control unit and for an interworking unit.

FIG. 2 shows a block diagram or key functional components in the MGCF and IM-MGW. An H.245 Client 50, i.e. the functional unit which terminates the H.245 protocol, is located in the MGCF and exchanges via internal interfaces information regarding the selection of the codec and the execution sequence of call setup with the functional components responsible for call control or with a call signaling unit 52, preferably the functional component or components that are responsible on the IMS side for handling the SIP and the SDP. From the CS side, H.245 messages received are forwarded within the H.223 protocol from an H.223 multiplexer/demultiplexer 60 in the IM-MGW via an H.245 encapsulation/decapsulation unit in the IM-MGW which packs the messages for transport with the aid of the H.248 protocol and passes on the Mn interface to the H.245 client 50.

The H.245 Client 50 thus exchanges information regarding the H.223 protocol with the H.223 multiplexer/demultiplexer 60. Media streams for audio and video are handled separately in the IM-MGW. Depending on the video codec selected on the IMS side and CS side and the details of its transport format in these networks, a transparent forwarding of the data, a so-called re-framing, i.e. a simple change of the transport format but also a complete conversion of the data between different codecs by a transcoder can be necessary. The method explained here allows a transcoding, especially for video codecs, to be largely avoided.

The MGCF also contains:
  A call controller 70, which signals in accordance with ISUP/BICC into the CS network and which exchanges signaling messages with the call controller 52 in accordance with a proprietary protocol for example. For example the call controller 52 then performs a protocol conversion i.e. a transmission of individual signaling messages of the one signaling protocol into signaling messages of the other signaling protocol.
  A transceiver unit 72, which sends or receives signaling messages in accordance with TCP (Transmission Control Protocol) or UDP (User Datagram Protocol) to and from the IMS.

The IM-MGW also contains:
  A transceiver unit 80, which sends or receives payload data in accordance with TCP (Transmission Control Protocol) or UDP (User Datagram Protocol) to and from the IMS.

FIG. 3 shows method operations and signaling messages of the Media Gateway Control Function MGCF and the IMS media gateway IM-MWG. The signaling operations for setting up a video telephony connection between the mobile station MS1 and the mobile station MS2 are individually as follows:

1. The MGCF decides to set up an H.324 connection for video telephony on the CS side. Initially the MGCF configures the physical termination on the CS network side. To this end the MGCF generates a new termination for packet transport in a new H.248 context with the aid of an H.248 Add command. For TDM (Time Division Multiplexing) transport the MGCF can instead move into a new context an existing termination which represents a fixed time slot in a physical line. The termination is allocated an H.248 stream, here for example the stream with the value 1.

2. The IM-MGW creates the termination accordingly and returns the code T1 for the termination and C1 for the context.

3. The CS-side bearer connection is established.

4. The MGCF creates in accordance with the existing H.248.1 and H.248.20 (Gateway control protocol: The use of local and remote descriptors with H.221 and H.223 multiplexing) standard a specific logical H.248 termination for describing the multiplexing in the same context C1 and expresses using the Mux parameter that the multiplexing is described in termination T1 and occurs in accordance with the H.223 standard. It describes the logical channel of the H.223 protocol that is to be used for H.245 signaling by a separate stream which is assigned the so called "logical channel number" (LCN) with value 0. The MGCF instructs the IM-MGW to begin the H.223 negotiation of the multiplexing level, preferably by a new H.248 signal which is called H223MultiplexingLevelNegotiation here. The MGCF also instructs the IM-MGW to send the MGCF a message with the agreed multiplexing level as soon as the H.223 negotiation of the multiplexing level is concluded, preferably by a new H.248 event which is called H223Establishment here. The MGCF also instructs the IM-MGW to send the MGCF a message with received H.245 signaling If the IM-MGW receives H.245 messages. Preferably the MGCF uses a new H.248 event to do this, which is called H245Signalling here.

5. The IM-MGW creates the new termination accordingly and returns the identifier T2.

6. The IM-MGW creates the H.223 connection and in doing so negotiates the multiplexing level with the CS-side mobile station, i.e. with MS1, in the example with the value 2.

7. The IM-MGW notifies the MGCF that the negotiation of the H.223 multiplexing level is concluded and which level was selected. The MGCF needs this information subsequently in order to specify the corresponding capability in the H.245 Terminal Capability Set message 16. Preferably the IM-MGW uses an H.248 Notify message with the new event H223Establishment which contains a suitable parameter, called MultiplexingLevel here, to specify the agreed multiplexing level.

8. The MGCF confirms the receipt of the Notify message.

9. The IM-MGW receives from the CS-side mobile station MS1 a Terminal Capability Set H.245 which can be combined with a Master-Slave Determination H.245 message.

10. The IM-MGW forwards the received H.245 message or messages transparently, i.e. unchanged. To do so the IM-MGW preferably uses an H.248 Notify message with the new event H245Signalling which contains a suitable parameter for specifying the H.245 signaling.

11. The MGCF confirms the receipt of the Notify message in accordance with H.248.

12. In accordance with H.245 the Terminal Capability Set H.245 message and the Master-Slave Determination H.245 messages require an acknowledgement. Since the MGCF terminates the H.245 signaling, the MGCF decides to send the required H.245 messages Terminal Capability Set Ack and Master-Slave Determination Ack via the IM-MGW in the H.245 connection. The MGCF creates the H.245 messages, forwards the messages to the IM-MGW and instructs the IM-MGW to forward the messages within the H.223 connection. To do this, the IM-MGW preferably uses an H.248 Modify message with the new signal, which is called H245Message here, and which contains a suitable parameter, called "information" here, to specify the H.245 signaling and is related to the stream parameter, i.e. the "stream" allocated in message 4 to the logical H.223 channel for the H.245 signaling 13. The IM-MGW forwards the received H.245 messages transparently in the H.223 connection through to the CS network side.

14. The IM-MGW acknowledges the Modify message 12.

15. The MGCF decides to send an H.245 message via the IM-MGW in the H.245 connection, in the example a Terminal Capability Set H.245 message which can be combined with a Master-Slave Determination H.245 message. In the H.245 Terminal Capability Set message the MGCF must take account of the negotiated multiplexing level as well as capabilities of the IM-MGW, for example which H.223 protocol options (e.g. the nesting depth for multiplexing) and which codecs the IM-MGW supports. The MGCF possesses either configured knowledge about this capability, or it queries this capability by an H.248 AuditCapabilities message from the IM-MGW. The MGCF preferably also takes into account information from the SIP/SDP signaling in the selection of the capability specified in the Terminal Capability Set, especially as regards the specified codec. The MGCF preferably selects codecs supported on both the IMS and on the CS network side in order to avoid transcoding. The MGCF creates the H.245 messages, forwards the messages to the IM-MGW and instructs the IM-MGW to forward the messages within the H.245 connection as already described in message 12.

16. and 17. Similar to messages 13 and 14, i.e. forwarding the H.245 messages to the CS side and confirmation to the MGCF by the IM-MGW.

18. The IM-MGW receives from MS1 a Terminal Capability Set Ack H.245 message, which is combined with a Master-Slave Determination Ack H.245 message.

19. and 20. Similar to messages 10 and 11.

21. The MGCF selects codecs for the video telephony, in which case it takes account of information from the SIP/SDP signaling on the IMS side as well as that contained in the Terminal Capability Set H.245 message 9. The MGCF preferably selects codecs supported on both the IMS and on the CS network side, in order to avoid transcoding. In particular the MGCF also extracts from the Terminal Capability Set H.245 messages 9 or 16 the H.223 logical channel number (LCN) corresponding to a selected voice or video codec. The MGCF creates an open logical channel H.245 message and then specifies the LCN of the selected codec. The MGCF creates the H.245 messages, forwards the messages to the IM-MGW and instructs the IM-MGW to forward the messages within the H.245 connection as already described in message 12.

In a case not shown here it can also occur that the MGCF receives via the IM-MGW from the CS network an Open Logical Channel H.245 message. In this case the capability has been selected in the CS network from capabilities offered in the Terminal Capability Set message 16.

22. and 23. Similar to messages 13 and 14, i.e. forwarding and confirmation by the IM-MGW.

24. The IM-MGW receives an Open Logical Channel Ack H.245 message from the CS side.

25. and 26. Similar to messages 10 and 11, i.e. forwarding of the H.245 message from the IM-MGW to the MGCF and confirmation of the receipt of this message by the MGCF to the IM-MGW.

27. The MGCF instructs the IM-MGW to create the logical H.223 channel which was already agreed with the aid of messages 21 to 26 via H.245 signaling. To this end the IM-MGW sends an H.248 Modify message regarding the multiplexing termination T2 in which it describes a new stream 3, in which case it specifies the LCN and the codec as in message 21.

28. The IM-MGW acknowledges the Modify message.

29. The MGCF instructs the IM-MGW to create a termination on the IMS side with which stream 3 is to be connected, so that the IM-MGW forwards the data assigned to the stream 3 on the IMS side or the CS network side to the other side in each case. To this end the IM-MGW sends an H.248 Add message relating to context C1, and specifies in the message that stream 3 is to be transported and the codec which is to be used for this purpose. If the same codec is specified in message 27 and 29, the IM-MGW recognizes that no transcoding is required.

30. The IM-MGW acknowledges the Modify message.

31. Operations similar to operations 21 through 30 are executed to configure a stream 4 for the bearer for transport of voice and to configure the corresponding speech codec for a termination T4.

Similar method operations will also be used for clearing down the video telephony connection between the mobile station MS1 and the mobile station MS2.

FIG. 4 shows the context for a video call, with the following then applying:

Termination:
T1: CS domains (CS bearer (BS30) for H.245 control, voice and video),
T2: Multiplexing (H.245 control, voice, video),
T3: Video with own RTP bearer, and
T4: Voice with own RTP bearer.

Stream:
Stream1: between T1 and T2 with data (H.245 control, voice and video),
Stream2: Terminated at T2 with H.245 control information,
Stream3: between T2 and T3 with video data, and
Stream4, between T2 and T4 with voice data.

In other exemplary embodiments services other than video telephony are involved, for example voice telephony and text messages. Protocols other than the stated protocols are also employed in other exemplary embodiments.

In further exemplary embodiments the functions of IM-MGW and MGCF are provided by one unit, especially by a data processing unit, so that there is no external transmission link between IM-MGW and MGCF.

In another exemplary embodiment a network configuration different from that shown in FIG. 1 is used. For example for an IP station in the IMS, which is connected via another access network, e.g. via DSL or WLAN or WiMAX. In general another network which employs SIP can also instead of the IMS. Likewise another station, for example a fixed network telephone, can also be used in the CS network. Alternatively stations other than those depicted in FIG. 1 are used in both networks.

The system also includes permanent or removable storage, such as magnetic and optical discs, RAM, ROM, etc. on which the process and data structures of the present invention can be stored and distributed. The processes can also be distributed via, for example, downloading over a network such as the Internet. The system can output the results to a display device, printer, readily accessible memory or another computer on a network.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide v. DIRECTV*, 358 F3d 870, 69 USPQ2d 1865 (Fed. Cir. 2004).

The invention claimed is:

1. A method for signaling by means of signaling messages between a control unit and an interworking unit, comprising:
   transmitting of a first H.248 ADD.req message from the control unit to the interworking unit,
   transmitting of a first H.248 ADD.resp message from the interworking unit to the control unit,
   transmitting of a second H.248 ADD.req message from the control unit to the interworking unit,
   transmitting of a second H.248 ADD.resp message from the interworking unit to the control unit,
   executing of an H.223 Multiplexing Level Negotiation by the interworking unit,
   transmitting of a first H.248 MOD.req message from the control unit to the interworking unit,
   transmitting of a first H.248 MOD.resp message from the interworking unit to the control unit,
   transmitting of a second H.248 MOD.req message from the control unit to the interworking unit, and
   transmitting of a second H.248 MOD.resp message from the interworking unit to the control unit.

2. The method as claimed in 1, wherein a bearer connection is set up by the interworking unit.

3. The method as claimed in claim 1, wherein one or more of the following actions are executed by the interworking unit or by the control unit:
   H.245: Terminal Capability Set, Master Slave Termination,
   H.245: Terminal Capability Set Ack, Master Slave Termination Ack,
   H.245: Open Logical Channel
   H.245: Open Logical Channel Ack.

4. The method as claimed in claim 1, wherein the method is used for setting up a video telephony connection.

5. The method as claimed in claim 1, wherein the method is used for setting up a connection between a first terminal and a second terminal.

* * * * *